United States Patent
Erlic et al.

(10) Patent No.: US 8,363,680 B2
(45) Date of Patent: Jan. 29, 2013

(54) NETWORK CONTROL ARCHITECTURE AND PROTOCOL FOR A DISTRIBUTED CONTROL, DATA ACQUISITION AND DATA DISTRIBUTION SYSTEM AND PROCESS

(75) Inventors: Tomislav Erlic, Victoria (CA); Mile Erlic, Victoria (CA); Glen Arthur Field, Victoria (CA); David Peter Harris, Wilmette, IL (US)

(73) Assignee: Precision MicroDynamics, Inc., Victoria, British Columbia (CA)

( * ) Notice: Subject to any disclaimer, the term of this patent is extended or adjusted under 35 U.S.C. 154(b) by 0 days.

(21) Appl. No.: 12/934,231

(22) PCT Filed: Oct. 29, 2009

(86) PCT No.: PCT/US2009/062558
§ 371 (c)(1),
(2), (4) Date: Sep. 23, 2010

(87) PCT Pub. No.: WO2011/053295
PCT Pub. Date: May 5, 2011

(65) Prior Publication Data
US 2012/0131130 A1     May 24, 2012

(51) Int. Cl.
*H04J 3/06* (2006.01)
(52) U.S. Cl. ............... 370/503; 370/360; 370/396
(58) Field of Classification Search ............... None
See application file for complete search history.

(56) References Cited

U.S. PATENT DOCUMENTS

| | | | | |
|---|---|---|---|---|
| 6,088,371 A * | 7/2000 | Inada et al. | | 370/537 |
| 6,088,665 A * | 7/2000 | Burns et al. | | 702/188 |
| 6,624,388 B1 * | 9/2003 | Blankenship et al. | | 219/130.5 |
| 6,992,975 B1 * | 1/2006 | Daniel et al. | | 370/222 |
| 7,035,269 B2 * | 4/2006 | Rolston et al. | | 370/400 |
| 7,095,957 B1 * | 8/2006 | Britz et al. | | 398/70 |
| 7,230,917 B1 * | 6/2007 | Fedorkow et al. | | 370/229 |
| 7,352,758 B2 * | 4/2008 | Makam et al. | | 370/405 |
| 7,457,322 B1 * | 11/2008 | Flood et al. | | 370/503 |
| 7,573,893 B1 * | 8/2009 | Elliot et al. | | 370/404 |
| 7,633,858 B2 * | 12/2009 | Semaan et al. | | 370/224 |
| 7,721,001 B1 * | 5/2010 | Flood et al. | | 709/248 |
| 7,818,457 B1 * | 10/2010 | Flood et al. | | 709/248 |
| 7,933,266 B2 * | 4/2011 | Zadikian et al. | | 370/389 |
| 8,107,362 B2 * | 1/2012 | Clauberg | | 370/222 |
| 2002/0131454 A1 * | 9/2002 | Franke et al. | | 370/503 |
| 2005/0085928 A1 | 4/2005 | Shani | | |
| 2005/0256735 A1 | 11/2005 | Bayne | | |
| 2007/0258550 A1 | 11/2007 | Wang et al. | | |
| 2008/0155241 A1 | 6/2008 | Varku | | |
| 2009/0089226 A1 * | 4/2009 | Bradford et al. | | 706/12 |
| 2009/0089325 A1 * | 4/2009 | Bradford et al. | | 707/104.1 |

OTHER PUBLICATIONS

International Search Report from International Application No. PCT/US2009/062558 filed Oct. 29, 2009.
Written Opinion of the International Searching Authority from International Application No. PCT/US2009/062558 filed Oct. 29, 2009.
International Preliminary Report on Patentability from International Searching Authority for Application No. PCT/US2009/062558 filed May 10, 2012.

* cited by examiner

*Primary Examiner* — Michael J Moore, Jr.
(74) *Attorney, Agent, or Firm* — Ungaretti & Harris LLP (57) ABSTRACT

A system and process for distributed control, data acquisition and data distribution. The system and process comprise a one or more chain of nodes configured to remove and add packets to a synchronous data stream without management or control of a master node. Additionally, the nodes are provided with offset parameters to affect synchronous activity.

20 Claims, 7 Drawing Sheets

Feedback Control System with a Networked Plant Interface

FIG. 1 Feedback Control System

FIG. 2 Feedback Control System with a Networked Plant Interface

FIG. 3 Extended Star Topology

FIG. 4 Ring Topology

FIG. 5 Redundant Topology

FIG. 6 Hybrid Topology

FIG. 7 Extended Star Network Example - Three Axis Inspection Machine

FIG. 8 Enumeration Packet

FIG. 9 Node Structure

T = synchronization period
$\delta_p$ = propagation compensation offset
$\delta_d$ = drift compensation offset
$\delta = \delta_p + \delta_d$

FIG. 10 Synchronization Clocks

NETWORK CONTROL ARCHITECTURE AND PROTOCOL FOR A DISTRIBUTED CONTROL, DATA ACQUISITION AND DATA DISTRIBUTION SYSTEM AND PROCESS

CROSS-REFERENCE TO RELATED APPLICATIONS

The present application is a 371 filing from International Application No. PCT/US2009/062558, with an international filing date of Oct. 29, 2009.

FEDERALLY SPONSORED RESEARCH OR DEVELOPMENT

N/A

FIELD OF THE INVENTION

The present invention generally relates to a system and process for efficiently transmitting data between a plurality of nodes of a control system; and more particularly, to a system and process for synchronous transmission of data to and from nodes in a distributed control, data acquisition and data distribution system without management of a master or control node to achieve high rates of data transfer in real-time with no data loss.

BACKGROUND OF THE INVENTION

Many applications exist in industry where it is desirable to control the behavior of a system or plant having a variety of different components. Examples of such components include machine tools, robotics, environmental systems and chemical processes. A typical controller would contain or be provided with a description of the desired behavior of the plant, be able to measure the condition(s) or state(s) of the plant, compare that state against the desired behavior and then direct the plant closer to the desired behavior by adjusting inputs to the plant. Such a system is referred to as a feedback control system.

In general the plant will have multiple inputs and multiple output states. Typically, the plant inputs are drive signals to actuators which are capable of affecting the plant's states, and the plant's outputs are signals from transducers which measure plant states.

Commonly the controller is a monolithic device. Its function is to: convert the signals representing the plant states into a form suitable for computation; obtain from an external source or from internal memory the desired plant behavior; compare the desired behavior with the actual behavior as represented by the obtained plant states; compute the appropriate way to direct the plants actuators; and output the required signals to the plant's actuators.

One modification to a typical monolithic controller structure splits the parts of the controller which convert the signals representing the plant states and/or drive the plant inputs out into one or multiple units. These units are then connected to the main control unit using some form of digital network.

Often the plant state signals and plant inputs are analog in nature which can be converted to digital signals. There are advantages of signal quality and reliability in performing a conversion to and from digital format in close proximity to the plant. Additionally, transmitting the resulting digital data across a shared digital network can reduce wiring complexity. In some plants, modules are added to the plant to make its inputs and outputs appear digital to the controller and allow the transmission of this data over a digital network. The resulting digital network can take many forms including, for example, a ring, tree, star or a combination of such topologies.

In any event, the control calculations are still performed in a central location called the controller and the description of the network connections and the data to be transmitted are located at this central location. Typically, the controller is referred to as the master and the nodes with which it communicates across the network are called slaves. In such environments, the controller or master manages the flow of data to, from and between the various slave devices.

The present invention is an improvement on such prior systems and processes.

SUMMARY OF THE INVENTION

Unlike the conventional master/slave environment, the present invention provides a system and process that permits control calculations to be distributed across a network. Further, the present system and process also spreads the description of the network and the details of which data is to be transmitted between which nodes on the network across the network. In this regard, the sense of master and slave is eliminated. The present system and process has benefits in computational performance as the total set of calculations can be spread across multiple parallel computational units, and in the flow of data in the network since each node contains the information as to which data it requires and which data it must transmit to another node. The flow of data does not need to be managed by a central "master" node.

The present system and process can be utilized for distributed control, data acquisition and data distribution using a network comprising two or more nodes arranged in a plurality of configurations, such as, but not limited to, an extended star, ring or tree. The configurations can be broken down into one or more chains of nodes. The network may be implemented using conductor, light fiber, and/or wireless media.

The present system and process manages higher data rates and accomplishes better timing accuracy than can be achieved with systems with one or more software protocol layers, by keeping data transfer and processing within hardware, such as semiconductor or optical logic. High volumes of data are managed by using buffers residing in the nodes. Such buffers can be essential when transferring large volumes of data to non real-time systems.

For ease of use, the nodes may acquire process and distribute modified data or resulting information, either independently or simultaneously, using floating point transformations. For efficiency, the nodes may acquire, process and distribute modified data or resulting information, either independently or simultaneously, using fixed point transformations. For high computational speeds, a floating point engine is implemented using fixed or reconfigurable semiconductor hardware such as silicon or germanium, or optical logic.

In one embodiment of the invention, a timing signal source may be multicast to nodes for reduced group jitter. The timing signal source may be distributed by conductor, optical, or wireless means. Accuracy of timing synchronization among the nodes may be accomplished by transmission line modeling.

According to an aspect of the present invention, information describing the data to be moved synchronously across the network is distributed across the nodes of the network as part of the each node's configuration. That is, the set of data each node transmits synchronously and the destinations to which this data is transmitted are configurable in each node. This enables data to be moved as required at a hardware level without management by a master node or requiring intervention from real-time operating system software on any of the nodes. From the receiving node's perspective the data is locally available; that is, the data arrives automatically without the overhead of making a request.

According to another aspect of the invention, each node has built into it, at the hardware/firmware level, parallel processing elements. These elements are directly integrated with the network synchronization heartbeat(s). This design allows complex hard real-time signal processing operations to be performed on data synchronously without the overhead of any operating system software; real-time or otherwise. Since the network moves synchronous data automatically (i.e., without management of a master node), the computational load may be spread across several nodes further increasing parallelism and computational performance.

In one embodiment, the network can be composed of several chains of nodes, each of which may have its own synchronization rate. A chain's synchronization rate may alternatively be shared by another chain, divided down from another chain or be independent. This ability can reduce overall system cost since subsystems which require only lower rates synchronization are not required to run at the maximum synchronization rate on the network.

In accordance with another aspect of the invention, individual nodes on a chain may have manual offsets to the chain synchronization timing. This may be necessary to compensate for timing with respect to a $3^{rd}$ party device to which the node is connected.

In accordance with one embodiment, the present invention provides a real-time network control architecture for a distributed control, data acquisition and data distribution system. The system comprises a first chain of nodes wherein each node is coupled to a network connection. The first chain of nodes includes a first terminus end node at a first end of the first chain of nodes, a second terminus end node at a second end of the first chain of nodes, and a first intermediate node between the first terminus end node and the second terminus end node. Additional intermediate nodes can be added to the first chain of nodes. The first terminus end node is configured to periodically generate a first synchronous data stream for transmission through the first chain of nodes to the second terminus end node and back to the first terminus end node. Each node of the first chain of nodes is configured to automatically move data one of to and from the first synchronous data stream without management of a master node as the first synchronous data stream passes through the node.

Each node of the system includes a memory having configuration information for configuring the node at start-up for moving data one of to and from the synchronous data stream as it goes through the node. The memory can be set up to include a circular buffer for transferring data one of to and from the synchronous data stream as it goes through the node.

The system can include a second chain of nodes wherein each node is coupled to a network connection. The second chain of nodes includes the first terminus end node (from the first chain of nodes) at a first end of the second chain of nodes and a third terminus end node at a second end of the second chain of nodes. The first terminus end node is configured to periodically generate a second synchronous data stream for transmission through the second chain of nodes to the third terminus end node and back to the first terminus end node. Each node of the second chain of nodes is configured to automatically move data one of to and from the second synchronous data stream without management from a master node as the second synchronous data stream passes through the node. One or more intermediate nodes can be positioned between the first terminus end node and the third terminus end node.

The first terminus end node can include a switch for moving data from the first chain of nodes to the second chain of nodes.

Each node can be configured to calculate an offset due to transmission and propagation delays of the synchronous data stream to keep the first chain of nodes synchronized. The nodes can include a countdown timer loaded with the offset to ensure action is taken synchronously with the other nodes.

Each of the intermediate nodes includes a first port connected to the network connection and a second port connected to the network connection. Additionally, each node includes a configurable logic section containing parallel processing primitives.

The nodes can be configured to be assigned a unique identifier during a first enumeration data stream generated by the first terminus end node.

In accordance with another embodiment of the invention, a system for distributed control, data acquisition and data distribution across a plurality of networked nodes in a plant is provided. The system comprises a first chain of nodes connected by a network. The first chain of nodes includes a first terminus end node, a plurality of intermediate nodes and a second terminus end node wherein each of the nodes are configured at start-up to one of remove one or more packets of data and add one or more packets of data to a synchronous data stream transmitted from the first terminus end node through the intermediate nodes to the second terminus end node and back to the first terminus end node on a periodic basis without management of a master node. Additionally, the nodes are configured to compute and update propagation delay offsets of the synchronous data stream to provide for synchronous activity by the nodes.

Each node includes a media access controller, a memory and a logic processor. Moreover, each node is connected to a component in a plant, such as a sensor, actuator, or servo control device.

The system can further comprise a second chain of nodes connected by a network. The second chain of nodes includes the first terminus end node, a third terminus end node and a plurality of intermediate nodes between the first terminus end node and the third terminus end node. The first terminus end node can include a switch for transferring data from the first chain of nodes to the second chain of nodes.

The first terminus end node is configured to transmit an enumeration data packet to the second terminus end node through the intermediate nodes and back to the first terminus end node to provide an initial node value to each node of the first chain of nodes.

Each node includes a countdown timer that is configured to be activated by the synchronous data stream to enable the node to act synchronously with other nodes in the first chain of nodes.

In accordance with yet another embodiment of the invention, a system for a distributed control, data acquisition and data distribution is provided. The system comprises a first chain of networked nodes having a first terminus end node, a plurality of intermediate nodes and a second terminus end node, wherein the first terminus end node is configured to generate a first synchronous packet stream for transmission from the first terminus end node to the second terminus end node and back to the first terminus end node. Each node is configured to one of remove one or more packets of data from and add one or more packets of data to the first synchronous data stream. Additionally, the system further comprises a second chain of networked nodes having the first terminus end node from the first chain of nodes, a plurality of intermediate nodes and a third terminus end node. The first terminus end node is configured to generate a second synchronous packet stream for transmission from the first terminus end node to the third terminus end node and back to the first terminus end node. Each node in the second chain of nodes is configured to one of remove one or more packets of data from and add one or more packets of data to the second synchronous data stream. The system also comprises a first clock for providing a base clock pulse to the first chain of nodes and a derived clock pulse to the second chain of nodes.

In accordance with another embodiment of the invention, a process for distributing data across a network is provided. The process comprises providing a network connection from a first terminus node to one or more intermediate nodes to a second terminus node forming a first chain of nodes, wherein each node includes a countdown timer. The process further comprises determining an offset parameter for each node for setting the countdown timer for affecting synchronous activity by the nodes of the first chain of nodes. Additionally, the process comprises generating a first synchronous data stream having a plurality of packets by the first terminus node and transmitting the first synchronous data stream through the one or more intermediate nodes to the second terminus node and back to the first terminus node. The process also comprises starting the countdown timer at each node in the first chain of nodes when the transmitted synchronous data stream reaches the node and performing an activity by each node when the node's countdown timer reaches zero.

The process can also comprise the step of generating a local synch pulse by each node when the node's countdown timer reaches zero. Additionally, the process can comprise the steps of removing one or more packets from the synchronous data stream as it passes through a node on the first chain of nodes without management of a master node, and adding one or more packets to the synchronous data stream as it passes through a node on the first chain of nodes without management of a master node.

The step of determining an offset parameter for each node for setting the countdown timer for affecting synchronous activity by the nodes of the first chain of nodes can comprise computing a transmission time delay and a propagation time delay for each node of the first chain of nodes. It can also comprise adding a manual offset to a computed offset parameter for a node of the first chain of nodes.

The process can also include the step of switching data from the first chain nodes to a second chain of nodes by the first terminus node Finally, the process may also include receiving an input signal from a plant component by a node of the first chain of nodes, and transmitting a drive signal to a plant component by a node of the first chain of nodes.

In accordance with yet another embodiment of the invention, a data control, acquisition and distribution system is provided. The system comprises a first chain of nodes including a first terminus end node and a second terminus end node. The first terminus end node is configured to generate a first synchronous data stream having a plurality of data packets for transmission to the second terminus end node and back to the first terminus end node. Each node in the first chain of nodes is configured to one of remove packets from and add packets to the synchronous data stream. The system also comprises a second chain of nodes including the first terminus end node and a third terminus end node. The first terminus end node is configured to generate a second synchronous data stream having a plurality of data packets for transmission to the third terminus end node and back to the first terminus end node. Each node in the second chain of nodes is configured to one of remove packets from and add packets to the second synchronous data stream.

The first chain of nodes can include a plurality of intermediate nodes between the first terminus end node and the second terminus end node. Additionally, the second chain of nodes can include a plurality of intermediate nodes between the first terminus end node and the third terminus end node.

The system can further include a third chain of nodes including the first terminus end node and a fourth terminus end node. The first terminus end node is configured to generate a third synchronous data stream having a plurality of data packets for transmission to the fourth terminus end node and back to the first terminus end node and each node in the third chain of nodes is configured to one of remove packets from and add packets to the second synchronous data stream.

The first terminus end node can contain a switch for moving data between the first chain of nodes and the second chain of nodes.

The system can also include a clock for generating a first clock pulse for the first chain of nodes and a second clock pulse derived from the first clock pulse for the second chain of nodes.

The system of claim 31 wherein the first terminus end node is configured to generate an enumeration pulse for assigning node values to each node in a chain and calculating a local synchronous pulse offset.

Other features and advantages of the invention will be apparent from the following specification taken in conjunction with the following Figures and Attachments.

BRIEF DESCRIPTION OF THE FIGURES AND ATTACHMENTS

To understand the present invention, it will now be described by way of example, with reference to the accompanying Figure and Attachment in which.

DETAILED DESCRIPTION OF A PREFERRED EMBODIMENT

While this invention is susceptible of embodiments in many different forms, there is shown in the Figures and will herein be described in detail preferred embodiments of the invention with the understanding that the present disclosure is to be considered as an exemplification of the principles of the invention and is not intended to limit the broad aspect of the invention to the embodiments illustrated.

Figure 1:
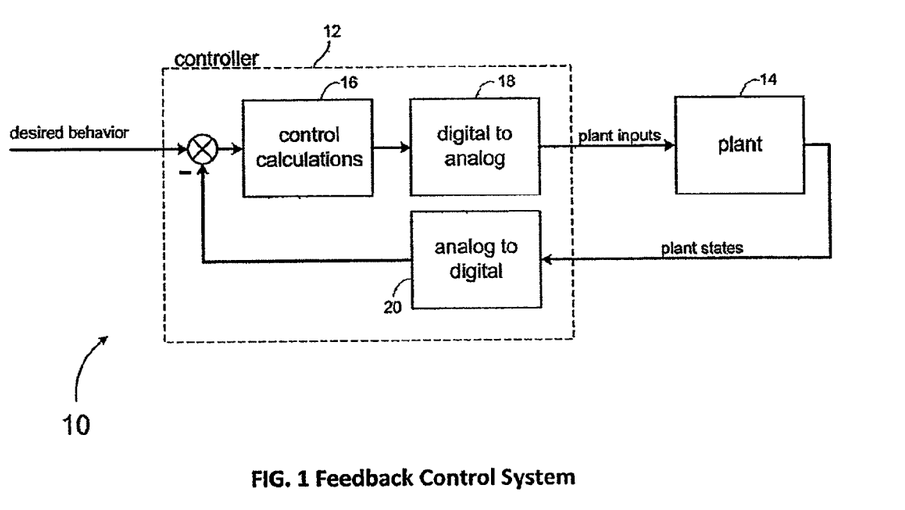
FIG. 1 is a schematic diagram of a feedback control system.

Referring to FIG. 1, a typical feedback control system 10 includes a controller 12 communicatively coupled to a plant 14. The controller 12 receives (or is pre-programmed with) desired plant behavior characteristics. The controller 12 monitors the plant states, and provides plant input signals to direct the plant toward the desired behavior characteristics. The controller 12 can include circuitry and/or software 16 for implementing control calculations based on the plant states and the desired behavior. The controller 12 can also include a digital to analog converter 18 and an analog to digital converter 20 to convert the plant inputs and plant states to the appropriate format.

Figure 2:
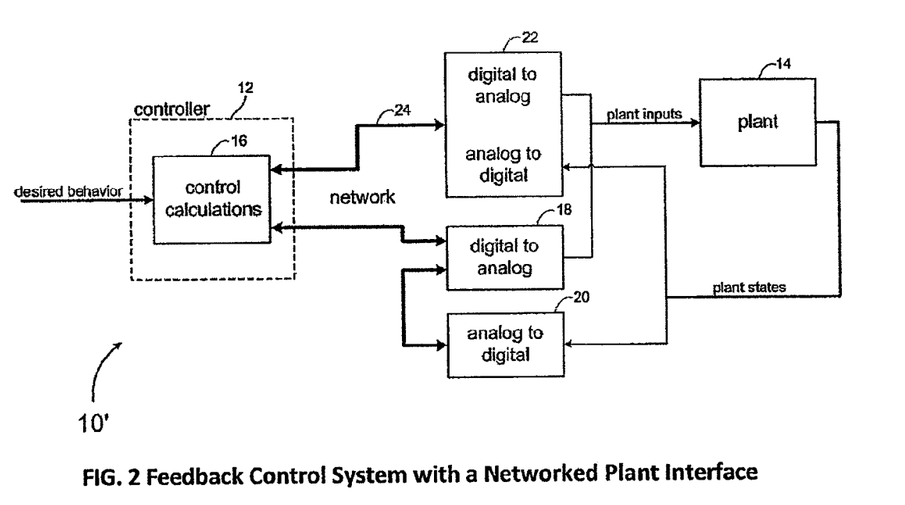
FIG. 2 is a schematic diagram of an alternative embodiment of a feedback control system having a network connection.

FIG. 2 shows a modified feedback control system 10'. The modified system 10' includes a combined digital to analog/analog to digital converter 22, and a network connection 24 between the controller 12 and all of the converters 18, 20, 22.

In either system 10, 10', the controller 12 is responsible for coordinating or managing the flow of data to or from each of the nodes in the plant. This control was typically implemented in the software layers of the system and required individual communication between a node and the controller for every transfer of data. This process was not conducive for synchronous movement of data across the system.

The present invention provides a system which removes controller management of data flow, and allows nodes on the system to synchronously move data about the network. This increases the efficiency of the system and provides for greater (i.e., faster) rates of data transfer.

The term data is used herein in the very general sense. The data may be configuration information for the receiving node, program instructions for the node to decode and process, physical state information to write to hardware such as IO lines or analog outputs, or bulk raw data such as transducer output signals or video for subsequent storage and or processing by the receiving node. Such video processing can include, for example, digitizing, compressing and/or format changing.

The present system is implemented in a networked environment. In this regard, the network is made up of a number of nodes connected via data ports. Communication through the connections is full duplex. Network connections may be conductor, optical fiber or wireless.

Figure 3:
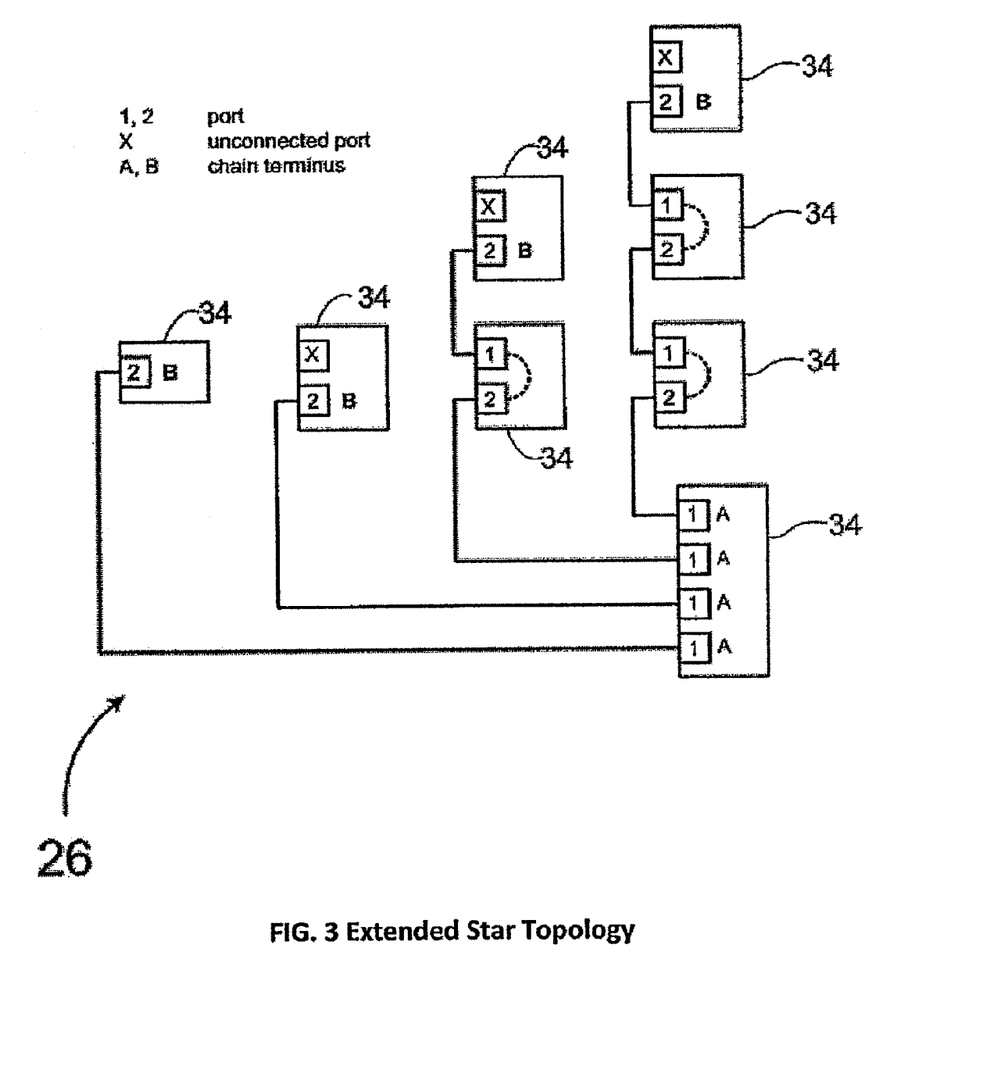
FIG. 3 is a schematic diagram showing an embodiment of the invention having a plurality of nodes in an extended star topology.
Figure 4:
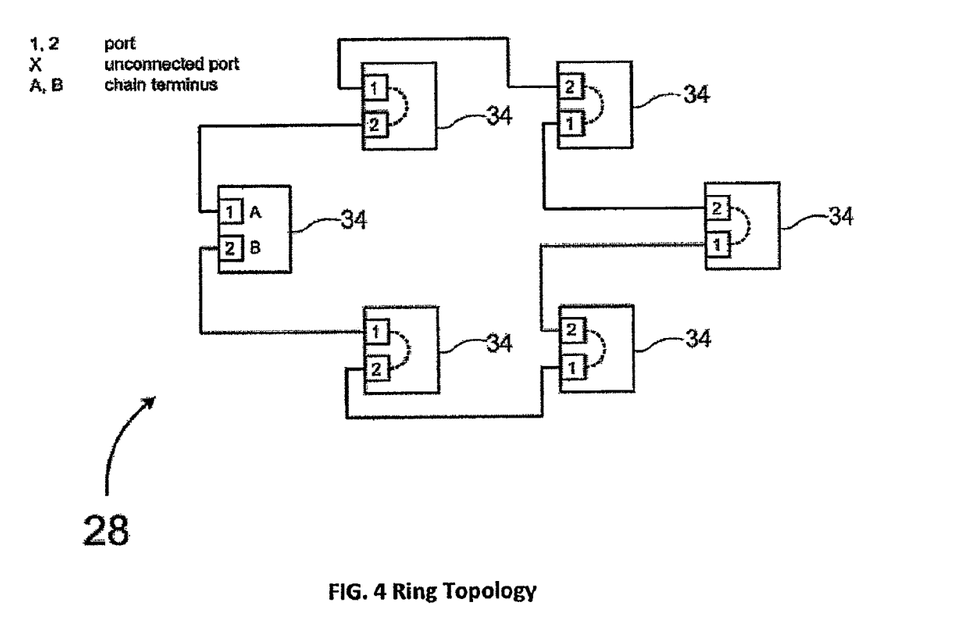
FIG. 4 is a schematic diagram showing an embodiment of the invention having a plurality of nodes in a ring topology.
Figure 5:
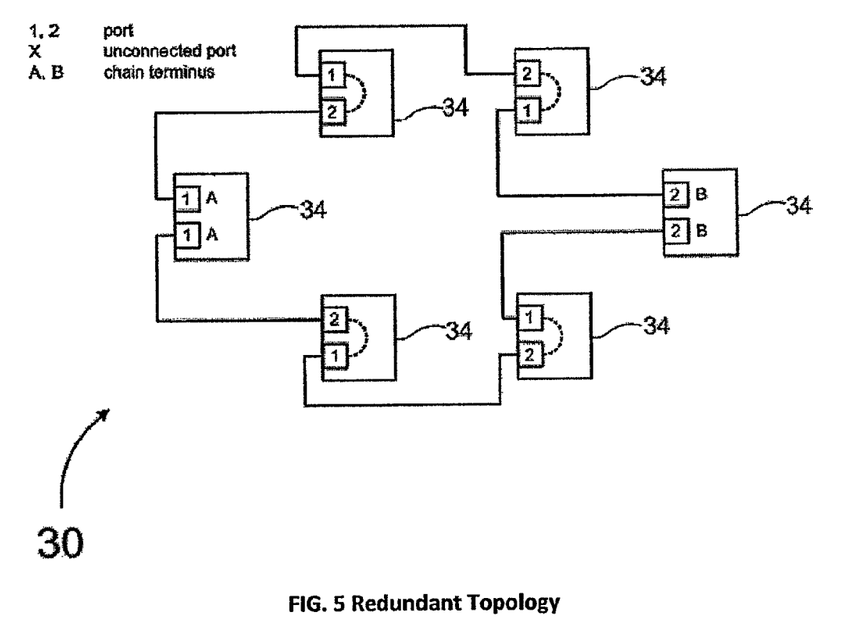
FIG. 5 is a schematic diagram showing an embodiment of the invention having a plurality of nodes in a redundant topology.
Figure 6:
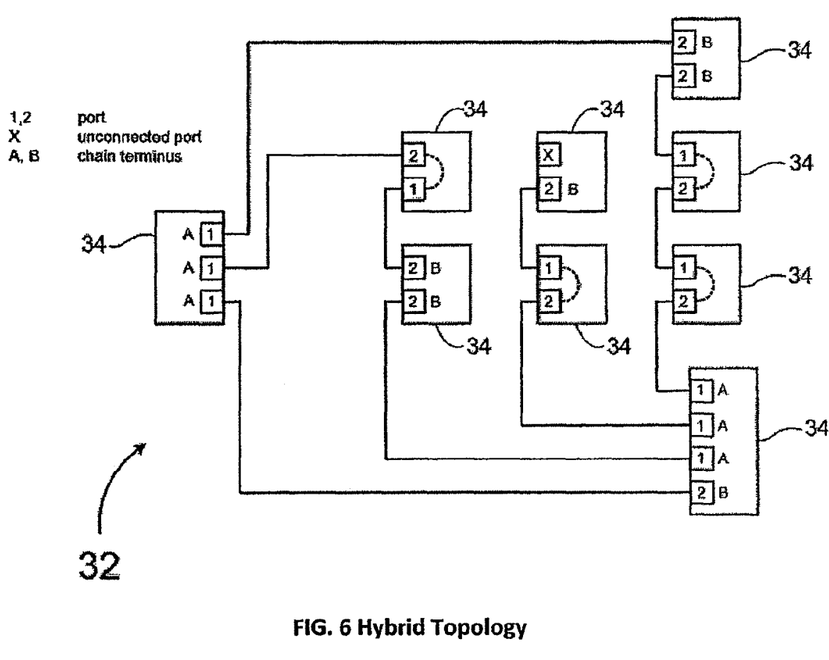
FIG. 6 is a schematic diagram showing an embodiment of the invention having a plurality of nodes in a hybrid topology.

FIGS. 3-6 show various typical configurations or topologies for the networked environment. FIG. 3 shows an extended star topology 26, FIG. 4 shows a ring topology 28, FIG. 5 shows a redundant topology 30, and FIG. 6 shows a hybrid topology 32. However, the present invention can also be utilized with other topologies. In fact, a wide variety of network topologies for use with the present invention can be constructed based on the following conditions: (1) a network is a collection of chains; (2) each chain has two termini (labeled A and B in the Figures); (3) each chain passes from terminus A to terminus B through paired sets type 1 and type 2 ports on individual nodes 34; and (4) connections between nodes are always between port types 1 and 2; never 1 to 1 or 2 to 2.

At startup each chain in the network is assigned a unique ID. Along each chain from terminus A to terminus B each node is enumerated in sequence. This information combined with a pointer into an individual node's memory space forms a unique address to the memory of all nodes across the network.

Figure 8:
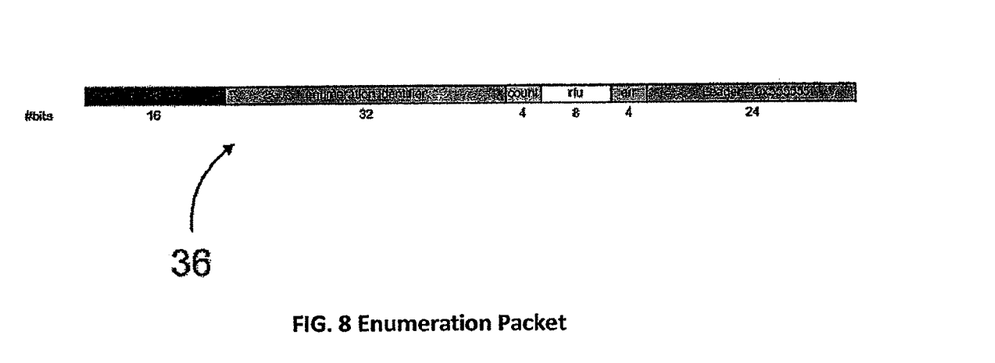
FIG. 8 is a block diagram of an enumeration packet in accordance with an aspect of the present invention.

Communication between nodes takes the form of groups of packets 36 (see FIG. 8) called streams. The stream will have a header indicating the type of transmission (i.e., synchronous or asynchronous), a group of one or more packets 36 and an optional termination bit sequence. Each packet 36 within the stream comprises a destination address, the data to be written to that address, and a number of cyclic redundancy check bits used to verify error free transmission.

Many systems require that information from various parts of the plant be sampled simultaneously, that control action in various parts of the plant be applied simultaneously and that a certain set of data be moved around through the system at a periodic interval with guaranteed real-time delivery. This is the role of the synchronous communication protocol within the network.

In the present system, each node 34 with one or more chain 'A' terminus points contains a timer which initiates a synchronous data stream transmission at a programmable regular interval. Each 'A' terminus point within a node 34 (for nodes having more than one terminus point) may either share a common timer or have its own derived or independent timer. Sharing or using a derived timer allows nodes 34 on multiple chains to be synchronized.

A synchronous data stream, as identified by its header, is placed on the chain. The data stream travels down the chain through each node from terminus A to terminus B. When it arrives at terminus B it is immediately reflected back along the chain, passing through each of the nodes again and returning to terminus A to complete the cycle. This cycle is repeated at a fixed programmable interval set in the timer.

As the front of the synchronous stream arrives at a node 34 during the outgoing transmission (i.e., arrives at the type 2 port) it starts a timer in the node. When the stream arrives at the node 34 during the return transmission (i.e., arrives at the type 1 port) the timer is stopped. This time differential is saved for each node 34 in the chain. Additionally, each node 34 also stores propagation delay time for passage of the data through the node 34. This propagation delay may be measured by the node 34 but is typically characteristic of the node's design and is stored as a fixed value in the node. This timing information is collected in one of the nodes (typically the node with terminus 'A') and used to compute the transmission delay times between each of the ports in the chain. The transmission delay times between the nodes and the propagation delay times within each node are used to compute a timing offset parameter which is written back into each node.

To synchronize multiple chains, the chains must share a common timer and the calculation of timing offsets uses the timing data of each of the chains. When the front of the synchronous stream arrives at a node during the outgoing transmission, the timing offset is loaded into a countdown timer and the counter is started. When the countdown timer reaches zero a synchronization pulse (SYNC) local to the node is generated. This SYNC pulse latches data which must be sampled synchronously across the network and initiates control actions which must be applied synchronously across the network. Correct setting of the timing offset parameters within each node ensures that the SYNC pulses occur simultaneously across a chain, and if desired, across multiple chains in the network.

The protocol can also provide for a manual timing offset which is added to the automatically determined offset. This provides fine tuning of the synchronization or allows for individual nodes SYNC to have a fixed and programmable offset from the rest of the network. This can be useful for compensating for synchronization delays within the plant itself for which the node has no direct control.

In operation, as a synchronous data stream passes through each node 34, including an 'A' terminus node, each node 34 removes packets 36 from the stream which are addressed to it and/or adds packets 36 to the stream which are destined for other nodes 34 along the chain. In many instances, the same data needs to be transmitted across the network each synchronous cycle. Therefore, each node 34 may be programmed with a list of data and corresponding destination addresses to be added to the synchronous stream on the way through. This information may be modified dynamically but is typically configured during startup.

Intermediate nodes (between the A terminus node and the B terminus node) in a chain may add data to the stream both on the outgoing transmission and the returning transmission. The sets of data to be added during outgoing or returning transmission may be programmed independently.

As shown in FIGS. 3-6, certain nodes can contain multiple termination points (A), and be included in more than one chain of nodes. These nodes with multiple termination points can contain a switch which allows data to be moved between chains. Data moved between chains is transmitted down the destination chain on the destination chain's next synchronous transmission cycle.

As referenced above, a synchronous data stream preferably contains the header, followed by a number of packets, followed by a stream termination sequence which contains a transmission error count and a cyclic redundancy check (CRC) for the termination sequence. Nodes in the chain remove packets from the stream and add packets between the header and the termination sequence as the stream moves through the node. When a node removes a packet from the stream it can verify the data in the packet by performing a CRC. If a transmission error is detected an error count is incremented. The error count is added to the error count of synchronous stream termination sequence and the termination sequence CRC data is updated. When the synchronous stream arrives back at termination 'A', the termination sequence is checked.

If the error count is non-zero or the CRC data is not verified, the synchronous transmission is preferably immediately repeated. In this instance, the synchronous stream header is modified to include a retransmission count. This is done so that a timer used to lock out asynchronous transmissions (discussed below) is not reloaded. If there are no transmission errors a synchronous cycle complete packet is transmitted down the chain to allow each node in the chain to restart synchronous communications.

If there are too many consecutive errors in the synchronous stream transmission an error flag is raised. Also, with knowledge of the transmission delays along a chain, a code containing the 'A' terminus also maintains an expected time of round trip for the synchronous transmission. If the synchronous transmission does not arrive back at terminus 'A' within the expected time window an error flag is raised indicating a possible break in the communication path along the chain.

Synchronous communication must take place at a reliable and repeatable interval. To ensure this, each node on each chain locks out asynchronous communication before the next synchronous cycle begins. Preferably, a lock-out flag is raised sufficiently far in advance of the synchronous stream transmission cycle to allow any asynchronous packet transmission in progress to complete.

Asynchronous communication lock out occurs when a countdown timer is loaded and started by the arrival of a new synchronization data stream. A new synchronization data stream is identified by a zero retransmission count in the synchronous stream header. The value loaded into this corresponding timer is sufficiently less than the synchronization period to allow asynchronous communication packets currently being transmitted to complete before the synchronization stream arrives.

In the preferred system, asynchronous communication is only permitted when not locked out by synchronous communication. Asynchronous communication on a node of a chain will be locked out when a countdown timer on the node for that chain reaches zero before the beginning of the next synchronous cycle. Pending asynchronous transmissions (if not completed) can be buffered until the synchronous communication cycle completes. Asynchronous communication may resume upon receipt of a synchronous cycle complete packet.

An asynchronous data stream preferably consists of a header followed by a single packet. Each packet contains an address, the data to be transferred and CRC bits to verify accurate transmission. When the asynchronous data stream passes through a node, it is checked and processed if the packet is addressed to the node. If the packet is not addressed to the node, it is passed along to the next node. If the packet gets to a chain terminus (either A or B), a chain identifier part of the address is checked to see if the packet needs to be switched to another chain, otherwise it is passed back along the same chain.

How an asynchronous packet is handled depends on its header. The packet may, for example, specify that data contained in a packet simply be written into the addressed memory of the receiving node without requiring that an acknowledgement packet be returned to the sender, or it may require the receiving node to confirm the write operation by returning a packet to the sender to acknowledge the operation or indicate an error and request a retransmission. Additionally, the packet may request that the receiving node send a return packet containing specified data.

Figure 9:
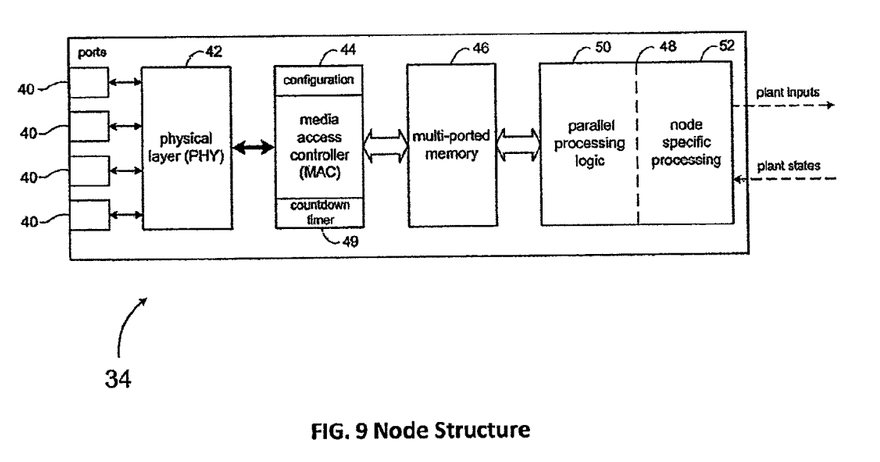
FIG. 9 is a block diagram of a node for use in the present invention.

FIG. 9 shows the structure of a typical node 34 utilized in the present invention. Each node 34 has one or more ports 40. All ports 40 in a node 34 are preferably capable of full duplex communication.

The ports 40 are connected to the node 34 through a physical layer 42 or PHY. The PHY 42 converts the format of a data stream on each port into a digital format that can be passed to a media access controller (MAC) 44 in the node 34. It also converts digital data from the MAC into the required format and transmits the data outward through the ports 40. Typically, the physical layer 42 would use industry standard devices such as an Ethernet PHY or LVDS transceivers. The PHY 42 must be capable of full duplex transmission.

The media access controller (MAC) 44 specifies the port 40 connections to the network and manages the transmission of data through the node 34. The MAC 44 also provides an interface to a node's hardware and possible processing capabilities through a multi-ported memory 46.

A node's configuration is preferably stored in non-volatile memory so that it self-configures at startup. Additionally, the configuration may be modified by appropriate command packets arriving on a port 40. Preferably, the configuration information will include (items 1-7 below):

(1) The number of ports 40 on the node and the configuration state of each port 40. Each port 40 is either type 1, type 2 or unconnected. If connected, each port 40 is assigned to a unique chain number. If a port 40 is a terminus to a chain the port 40 will be designated as an 'A' terminus or 'B' terminus. Connected ports 40 that are not a terminus will have a link to their paired port of the opposite type on the same node to continue the chain through the node 34.

(2) Node address information sufficient to determine if a packet arriving at a node 34 is to be processed by the node 34 or passed to the next node 34. This includes the list of chains which pass through or have a terminus at this node 34, the enumerated device number along each of those chains and a memory map for the node's dual ported memory.

(3) For each chain which passes through the node 34, a list of addresses in the node's multi-ported memory 46 whose data is to be read and added to a chain's synchronous data stream as it passes through the node 34 from terminus A to terminus B. The corresponding address information to which each piece of data is to be transmitted is also saved.

(4) For each chain which passes through the node 34, a list of addresses in the node's multi-ported memory 46 whose data is to be read and added to a chain's synchronous data stream as it passes through the node 34 from terminus B to terminus A. The corresponding address information to which each piece of data is to be transmitted is also saved. For nodes at the terminus, the list would be empty.

(5) The value to load into a countdown timer 49 for each chain to block asynchronous transmission before the next synchronous cycle.

(6) The timing offset parameter used to generate the SYNC pulse for each chain passing through the node 34. These offsets are loaded with starting values, perhaps saved from the last time the system was powered. They can be updated automatically once the system is up and running.

(7) The manual timing offset parameter used to provide manual adjustment to the SYNC pulse for each chain (if needed).

When a synchronous data stream arrives on a port 40, as indicated by the stream's header, the MAC 44 begins in-line processing of the packets contained in the stream. Packets whose address information matches the current node 34 are removed from the stream and the packet data is written to the addressed location in the multi-ported memory 46. The synchronous stream header and packets whose address information does not match the current node 34 are passed along the chain via the linked port 40.

If the port 40 is a terminus and the chain identifier of the packet address does not match the current chain, the node 34 is checked for a matching chain also terminating at the node 34. If a match is found, the packet is switched to the addressed chain for transmission on that chain's next SYNC cycle.

If the port is a terminus 'B' port, the stream is reflected back up the chain for the return trip to the 'A' terminus. As the data stream passes through each node 34, the MAC 44 in the node 34 will add data packets that it has been configured to add (typically configured at start-up) into empty packet slots created by removed data packets.

If a packet is removed from the stream and there are no packets left to replace it, a default null packet is preferably dropped into the stream. If there are more packets to add to a stream than are removed by a node 34, then the packets are added after the last packet in the stream and just before a stream termination bit sequence.

When a packet is removed from the stream, its CRC data is checked to verify accurate transmission. Any CRC errors are logged in the node and the transmission error count in the stream's termination bit sequence is incremented. When the synchronous stream arrives back at the 'A' terminus, packets destined for this node 34 are removed and the associated data written to memory. Packets addressed to other chains are switched to the appropriate chain for that chain's next SYNC cycle.

The stream's termination bit sequence is checked for its transmission error count and CRC data. If the transmission error count is not zero or the CRC data does not indicate an error free transmission, the SYNC cycle is immediately repeated. To indicate a re-try of a previous synchronous transmission the MAC 44 in the terminus node 34 increments the re-try count in the stream header. If the re-try count exceeds a maximum value, the MAC 44 sets an internal error state in the node 34 and halts synchronous transmissions on the chain until the error state is cleared. Nodes 34 connected on the chain will go into their own error state when the next synchronous transmission is not received within the expected time window. Each node 34 is programmed to process and handle these error states locally in a means suitable to the particular system.

As mentioned above, an asynchronous data stream arriving at a port 40 on a node 34 contains only one packet. The MAC 44 decodes the address information of the packet. If the local node 34 is addressed the packet is processed, otherwise the asynchronous data stream is passed along the chain. The handling of the packet depends on the contents of the header.

Each node 34 also includes processing and hardware logic 48. Preferably, this is broken into a parallel processing logic portion 50 and a node specific processing portion 52. The processing and hardware logic 48 is what distinguishes one type of node 34 from another. The logic 48 is interfaced to the MAC 44 through the multi-ported memory 46. These circuits may contain interfaces to the plants transducers for things such as temperature, pressure, chemical composition, speed, position. Additionally, the circuits can contain interfaces to audio or video devices where data from these devices is read, possibly processed and then stored in the multi-ported memory 46 for access by other nodes 34 in the network.

The logic 48 may perform control calculations and/or drive plant actuators such as IO lines, electric motors, pneumatics and hydraulics. It may also perform human interface functions such as terminal input, operator controls interface and video display. Processing may be simple such as the mapping of a few IO lines between the multi-ported memory and relays or it may be complex, involving multiple possibly parallel computation operations.

Figure 7:
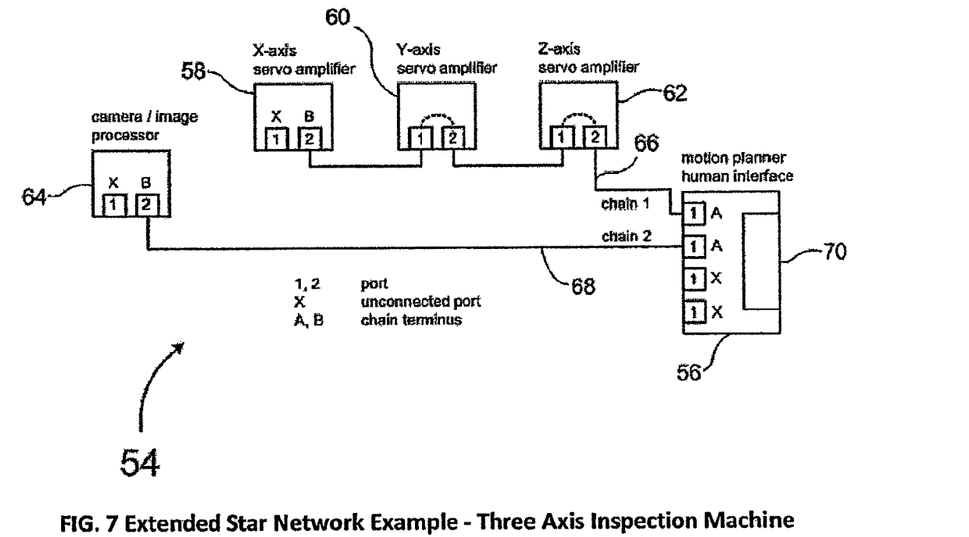
FIG. 7 is a schematic diagram of a plurality of nodes for a three axis inspection machine in accordance with an embodiment of the present invention.

FIG. 7 illustrates a particular example of the present invention. Specifically, FIG. 7 shows a networked system 54 including a set of nodes connected to operate an automated three axis inspection machine. The configuration shown uses a multi-ported node 56 which provides a human interface, three amplifier nodes—an X-axis servo amplifier node 58, a Y-axis servo amplifier node 60 and a Z-axis servo amplifier node 62—responsible for the low level servo control of axis drive motors (not shown), and a camera node 64 which acquires and processes image data. The system 54 comprises a Cartesian X-Y base stage with a digital video camera mounted on the Z-axis above the stage base.

Four of the nodes are set up as a first chain of nodes 66 (e.g., chain 1), with the human interface node 56 acting as a first terminus end node (A) of the first chain 66, the X-axis servo amplifier node 58 acting as a second terminus end node (B), and the Y-axis servo amplifier node 60 and Z-axis servo amplifier node 62 being intermediate nodes. A second chain of nodes 68 is formed with the human interface node 56, again acting as the first terminus end node (A), and the camera/image processor node 64 acting as a third terminus end node (B). The second chain of nodes 68 does not include any intermediate nodes.

The human interface node 56 takes command inputs from an operator or a stored command file, and translates these commands inputs into set-points, IO operations and configuration requests which are distributed to other nodes. It also collects status information from the other nodes for display to the operator. This information includes axis state information such as position and velocity, IO state, error status, and image data.

The camera node 64 captures the video image and then processes the image to determine the position in the camera's field of view of an operator specified feature. This position information is transmitted to the X-axis and Y-axis nodes 58, 60 to offset the operator commanded positions to center the feature in the camera's field of view. The camera will send position offset information to the Z-axis node 62 to provide automatic focus adjustment.

The servo amplifier nodes 58, 60, 62 drive the motors for the three axes of the machine. They obtain the position and velocity information used to close the servo loops from sensors on their respective axes. Set-point information is supplied by the human interface node and target offset information is provided by the camera node 64.

Upon start-up, each of the nodes in the system 54 self-configures from configuration information stored in the node's memory. Alternatively, the human interface node 54 can provide the configuration information, and/or modify any stored information based on any input received by the node 56. Following the node configuration, the human interface node 56 generates a first initial enumeration packet stream which is transmitted along the first chain of nodes 66. The human interface node 56 also generates a second initial enumeration packet stream which is transmitted along the second chain of nodes 68. These enumeration packet streams provide identification for the nodes on the respective chains 66, 68, and establish an offset parameter for each node.

Once the nodes are configured and provided with the respective offset parameters, the human interface node 56 generates a first synchronous packet stream for the first chain of nodes 66, and a second synchronous packet stream for the second chain of nodes 68.

As described in more detail below, each of the servo amplifier nodes 58, 60, 62 synchronously sample position data of the three axis inspection machine, and/or provide desired movement signals to the machine. As the first synchronous packet stream moves up the first chain of nodes 66, the X, Y and Z-axis servo amplifier nodes 58, 60, 62 remove desired position information packets from the stream and/or add measured position information packets to the stream.

Specifically, each of the servo amplifier nodes 58, 60, 62 removes its set-point information from the stream. A single set point consists of three pieces of data: the set-point position, the set-point velocity and the set-point acceleration. Additionally, each of these nodes removes its respective offset data computed and transmitted by the camera node 64. Each of the nodes also adds its actual position data to the stream. This added data is addressed to the human interface node 56.

Measured position information is provided to the camera node 64 on the second chain of nodes 68 from the first chain of nodes 66, and desired movement information is provided from the camera node 64 to the first chain of nodes 66. The transfer of information (i.e., data) from one chain to the other is accomplished by a switch 70 in the interface node 56.

Referring to the invention generally, an essential capability of every node 34 is that it must be able to synchronously transfer data from a specified set of addresses in the multi-ported memory, to other nodes in the network. The data to be transferred at each synchronous interval is configured into each node. Efficiencies are gained by not requiring other nodes to make the same data request each cycle or having a master node moderate the movement of data from one node to the other.

The regions of memory on a node to be transferred are preferably configured as a set of circular buffers. In this regard, any contiguous region of the node's memory may be defined as a circular buffer using the following parameters:

(1) Source Base Address—The address of the start of the circular buffer in the source node's memory block.

(2) Source Buffer Length—The number of pieces of data that can be stored in the source circular buffer.

(3) Source Address Offset—Offset from the source base address into the source node's memory block. This is typically initialized to zero.

(4) Destination Node—The chain number and node number to which the data is to be transferred.

(5) Destination Base Address—The address of the start of the circular buffer on the destination node's memory block.

(6) Destination Address Offset—Offset from the destination base address into destination node's memory block. This is typically initialized to zero.

(7) Destination Buffer Length—The number of pieces of data that can be stored in the destination buffer.

(8) Data Transfer per Cycle—The number of pieces of data to transfer from the source buffer to the destination buffer each cycle.

These configurable parameters allow several types of synchronous data transfer to occur:

(1) Individual Data—To transfer a single piece of data, source and destination buffer lengths are set to one. The data transfer per cycle parameter is set to one. The source base address is the memory address from which the datum is to be read and the destination base address is the address in the destination node to which the datum is to be written. Both source address offset and destination address offset are set to zero. When the node's internal synchronization signal occurs a data packet is constructed containing the destination chain number, destination node number, the destination address, the source data, and cyclic redundancy check (CRC) bits. The destination address is the sum of the destination base address and the destination address offset. The source data is read from the address obtained by summing the source base address with the source address offset. The CRC bits are computed from the other bits which make up the packet. This packet is added to a FIFO of packets to be added to the synchronous data stream as it passes through the node. The source address offset and the destination address offset are incremented by one. Since both buffers are unit length both offset values immediately wrap back to zero.

(2) Data Blocks—To transfer a block of contiguous block of data, the source and destination buffer lengths and the data transfer per cycle parameter are all set to the same value greater than one. Data transfer per cycle packets are created and added to the FIFO in the same manner as the individual data packet with the source and destination address offsets being incremented by one after each packet. When the last packet is added to the FIFO the address offset values will wrap back to zero, ready for the next cycle.

(3) Partial Data Blocks—Large blocks of data can be synchronously transferred over multiple cycles by transferring a portion of the data in each cycle. The mechanism is the same as the block transfer method except that the data transfer per cycle parameter is less than the buffer lengths. When the address offset values increment to the buffer length they wrap back to zero.

(4) Buffered Individual Data—In many systems it is necessary to send a sequence of command data equally spaced in time. The command data is computed in the processing section of one of the nodes and must be sent one piece of data at a time at absolutely regular intervals to one or more other nodes. If the computations required to generate the command data are complex or need to be programmable by a user, then the processing section of the node is likely a processor computing the command data in software. To use the individual data transfer method would require that the software be capable of computing the next piece of command data and writing it to the memory block at absolutely repeatable intervals. This would require that the software be hard real-time. For short intervals this becomes very expensive or impossible. The solution is to use the memory block of the node as a buffer. This makes the processor's job simpler in that the software needs only to be able to keep pushing data into the memory block buffer as it is computed and is not required to provide hard real-time synchronous delivery of the data. As long as, on average, the processor can compute the data faster than the data is transmitted, the network protocol will take care of the hard real-time delivery. To set up the buffer, the buffer length is set to the desired size of the buffer. The data transfer per cycle parameter is set to one. The size of the destination buffer is one. At each synchronous cycle one piece of data is removed from the source buffer and transmitted to the specified address on the destination node. The source address offset then increments to the next element in the buffer in preparation for the next cycle. When the processor writes into the buffer it begins writing into the buffer at the offset immediately after the last address it wrote and may continue to add data in sequence to the buffer until one address one before the current source address offset.

The synchronous data transfer configuration for each network node may be loaded at node power up from non-volatile memory on the nodes themselves. Alternatively, one or more of the nodes on the network may configure the network nodes using asynchronous data communication.

Referring back to the system 54 of FIG. 7, the motion planner/human interface node 56 is connected to the first chain and the second chain. Because it is terminus 'A' for both chains, it is node zero on both chains. The motion planner in node zero interprets commands from a user, plans the motions of the three axes and then transmits the set-points for each of the axes to the corresponding nodes. This is set up on chain one 66 node zero 56 by configuring three buffers, one for each axis. The buffer configuration parameters are as follows:

Source Base Address: The starting address in node zero's memory block for a buffer to which the set-point data for one axis will be written. A single set-point consists of three pieces of data; the set-point position, the set-point velocity and the set-point acceleration. These three-tuples of data are written into the buffer by the node zero processor in a consistent order, one three-tuple for each synchronization cycle.

Source Buffer Length: The length of the buffer in node zero's memory block. This is specified long enough so that there will be enough data that nodes zero's processing unit can keep the buffer filled. Several set-points are written to the buffer at once. Time intervals between writing groups of set-points are typically longer the synchronization period. The protocols built in buffering mean that the node zero processor is not required to have hard real-time performance.

Source Buffer Offset: The offset into the buffer from which data is read to be transmitted. This is initialized to zero and will automatically increment as data is pulled from the buffer.

Destination Node: The destination node identifier. This will be first chain 66 and one of node one, node two or node three depending on whether the buffer id is for the Z, Y, or X axis.

Destination Base Address: The base address in the destination node to which the set-point data is to be written.

Destination Address Offset: The offset into the buffer in the destination node to which set-point data is to be written. This is initialized to zero and will automatically increment as set-point data is pulled read the source buffer and added to the transmission FIFO.

Destination Buffer Length: The length of the destination buffer. The servo amplifier nodes accept only one set-point at a time but a single set-point consists of three pieces of data; the set-point position, the set-point velocity and the set-point acceleration. The set-point buffer length is therefore three.

Data Transfer per Cycle: The number of pieces of data to transfer per cycle is set to three. On each synchronous cycle one set-point is transferred. Each set-point is made up of three pieces of data; set-point position, set-point velocity and set-point acceleration.

Referring back to FIG. 7, the X-axis servo amplifier node 58, the Y-axis servo amplifier node 60 and the Z-axis servo amplifier node 62 on the first chain 66 measure the actual position of their respective axes and transmit this information back to the human interface node 56 (i.e., node 0). This is configured by specifying unit deep source and destination buffers on each node with the appropriate address of the source and destination data.

The camera node 64 on the second chain 68 collects image data from a camera mounted on a Z axis pointing down at an X-Y stage. An image frame is captured at sixty frames per second. A node specific processing section of the board computes the center of area of a specified feature and transmits the X and Y offsets of the center of area to the X and Y axis servo amplifier nodes 58, 60 on the first chain 66. This is configured with two unit deep source and destination buffers; one for each of the X and Y axes. The camera node 64 also uses its parallel processing logic section to compress the image frames before they are transmitted to the human interface node for display. Transmission is accomplished by configuring a partial data block transfer. The source and destination buffer length are configured to be of sufficient length to hold a compressed frame. The data transfer per cycle parameter is configured such that the portion of the frame transferred in each synchronous interval times the number of synchronous intervals in the frame rate period will transfer the entire frame at a specified frame rate, such as sixty Hertz intervals (however, other rates are possible).

Figure 10:
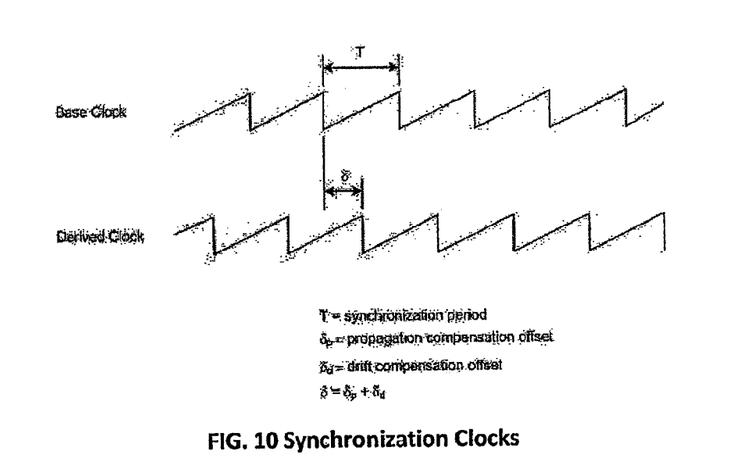
FIG. 10 is a timing diagram for a base clock and a derived clock for use in the present invention.

In accordance with preferred embodiments of the present invention, each node 34 in a system has its own independent clock. This independent clock can be simply a counter 49 with a configurable roll-over point that is driven by a clock crystal. Moreover, each node 34 maintains two clock signals—a base clock and a derived clock which is driven by the same crystal but offset from the base clock as shown in FIG. 10.

While based on the IEEE-1588 precision time protocol, synchronization of data sampling and control action across network nodes in the present invention is an improvement from this standard. Unlike the present system, in IEEE-1588 the master clock device periodically launches an exchange of messages to slave devices. These exchanges must not be interrupted by any other network traffic. Timing information, including when the message is transmitted by the master, received by the slave and returned to the master are sent to each slave to allow it to update its offset.

The present system does not require a separate message exchange protocol to keep the nodes in a chain synchronized. Instead, the parameters required for each node to compute its own offset are generated as a result of timing measurements on the synchronous data stream as it passes down and then back up the chain at regular intervals.

The offset in each node comes from two components. The first is due to propagation delays between and through the nodes on a chain. These delays are due to the separation between the nodes and the timing of the signal to pass through a node. Since the timing of a signal as it passes through a node is controlled by digital a clock crystal, the propagation timing through each node in known. Further since each node uses the same protocol logic the propagation time through each node is the same. The propagation time between the nodes can be determined by measuring the interval between the arrival of the synchronous data stream at the node on its outgoing path from terminus 'A' down the chain and its arrival back at the node during the synchronous data stream's return trip to terminus 'A' for each node. This time differential data for each node is collected and the wire propagation delay times are calculated. The propagation delay times are property of the network connections and are constant for a fixed network configuration. The propagation compensation offsets are loaded from non-volatile memory and/or determined at system start-up. They must be recalculated if the network configuration is changed.

In the present system, the base synchronization clocks on a chain are started by a "clock start" packet which passes down and back up the chain during startup. The passage of this packet is sufficient to set the offset parameters due to propagation delays. If the propagation compensation offsets need to be recomputed while the system is running (e.g., due to changes to the network of temperature variations), the data required to compute the new offsets is automatically updated with the passage of every synchronous stream.

A node in the present system has its base clock started by the "clock start" packet, and an offset which must be added to the base clock to compensate for propagation delays. If the crystals driving the clocks on each node had exactly the same frequency, the derived clocks would remain synchronized with only propagation compensation. However, the node clocks will tend to drift with respect to one another over time, which must be compensated. The passage of the synchronization stream is again used to determine the offset to compensate for clock drift. The synchronization data stream is generated at terminus 'A'. It is generated at a fixed count in the terminus 'A' base clock cycle and transmitted down the chain. The leading edge of the synchronous stream will arrive at the next node in the chain at an offset from the terminus 'A' count equal to the propagation delay between terminus 'A' and the next node. Since the next node base clock was started with this same delay, the stream should arrive at the same count in this node's base clock as the count in the preceding node at which it was initiated. This count is configured in each node at startup. The difference in count values is due to clock drift. This count difference is the drift compensation offset. It is updated every synchronization cycle and added to the base clock along with the propagation compensation offset to generate the derived clock. In this manner, the derived clocks in each node are synchronized across the chain.

In accordance with one embodiment, the present system can support a separate synchronization rate for each chain in a multiple chain topography. Multiple chains can be synchronized by sharing a clock. For the example in FIG. 7, the motion planner/human interface node 56 can use the same base clock to drive both the first chain of nodes 66 and the second chain of nodes 68 at the same frequency. If, on the other hand, the amount of image data that must be moved is large and servo rate requirements of the servo axes are not demanding, one chain's synchronization frequency may be a derived integer multiple of the other; e.g., 5 kHz for the first chain of nodes 66 and 100 kHZ for the second chain of nodes 68.

The synchronous clock protocol of the present system is sufficient to obtain synchronization among the network nodes within plus or minus twenty nanoseconds. For systems which require even tighter synchronization, the nodes can be configured to include a synchronous clock input which may be optionally connected. This input is driven by one of a set of precisely matched 10 MHz clock signals; one signal for each node. Each signal is driven from a single system node which contains a single precision crystal and a parallel clock driver circuit. Line lengths from this node to the target nodes are designed to have matched length and impedance. Additionally, printed circuit board trace lengths for this signal are matched on each target node. In this configuration, the network synchronization is used as an enable. The actual synchronization pulse which latches data and synchronizes control outputs occurs on the next edge of the clock input after the network synchronization event. This technique allows node synchronization to within one nanosecond or less.

The present system provides several advantages (some, or all of which may be realized depending on the system set-up) over existing real-time network control architectures.

For example, the data that each node is to transmit to the network destination to which it is to be sent is configured at start up in each node. In this regard, each node moves the required data automatically in hard real-time at the synchronization interval. Moreover, synchronous communication is peer-to-peer. Thus, data movement between nodes does not require management by a master node. Accordingly, network performance is increased by avoiding the creation of a bottleneck in the network.

Additionally, in accord with one preferred embodiment, the configured interface between the network MAC and the node specific processing elements is a multi-ported flat memory block structure. This structure has low protocol overhead and provides a generalized interface to node specific processing elements.

Preferably, the configurations of data groupings within the memory block are organized as circular buffers. This allows for a flexible configuration where the transfer of individual pieces of data, blocks of data, or partial blocks of data may be synchronously transferred. The configuration of the circular buffers is contained within the MAC and is a property of the network protocol. Accordingly, the nodes do not require real-time operating systems to ensure that data is moved between nodes in hard real-time. Moreover, the flow of synchronous data between nodes may be altered while the network is active by adding, removing or redirecting source data buffers.

In the present system, data movement is transparent to the processing elements which use the data. The required data is transferred automatically and error free and is available on time in local memory. Therefore, the processing elements do not require knowledge of the network connections. This makes the development of the processing operation at each node simpler than prior systems. Development is done as though all required resources are locally available. From the system developer's point of view there are multiple parallel processing units, which although they are distributed over a network, may be treated as though they are co-located with a shared memory space.

As discussed above, synchronization does not require a separate set of messages between the node with the master clock and each of the other nodes. Instead, the required offsets are computed and updated as part of the synchronous communication protocol.

In accord with an embodiment of the invention, each node contains a configurable logic section which contains parallel processing primitives. The operation sequence is configured by a state machine. This logic is used to reduce network traffic by performing operations on raw data before adding it to the transmit buffers; for example video compression.

While the specific embodiments have been illustrated and described, numerous modifications come to mind without significantly departing from the spirit of the invention and the scope of protection is only limited by the scope of the accompanying Claims.

We claim:

1. A real-time network control architecture for a distributed control, data acquisition and data distribution system of an industrial plant having a plurality of actuators and transducers for controlling and monitoring aspects of the plant comprising:
a first chain of nodes wherein each node is coupled to a network connection and to one of an actuator and a transducer in the industrial plant, the first chain of nodes including a first terminus end node at a first end of the first chain of nodes, a second terminus end node at a second end of the first chain of nodes, and a first intermediate node between the first terminus end node and the second terminus end node, wherein the first terminus end node is configured to periodically generate a first synchronous data stream for transmission through the first chain of nodes to the second terminus end node and back to the first terminus end node, and wherein each node of the first chain of nodes is configured to automatically move data one of to and from the first synchronous data stream at a determined synchronous time interval without management of a master node as the first synchronous data stream passes through the node, wherein the data moved to and from the first synchronous data stream relates to one of monitoring and controlling the one of an actuator and a transducer coupled to the node.

2. The system of claim 1 wherein each node includes a memory having configuration information for configuring the node at start-up for moving data one of to and from the synchronous data stream as it goes through the node.

3. The system of claim 2 wherein the memory includes a circular buffer for transferring data one of to and from the synchronous data stream as it goes through the node.

4. The system of claim 1 comprising a second intermediate node between the first terminus end node and the second terminus end node.

5. The system of claim 1 comprising a second chain of nodes wherein each node is coupled to a network connection, the second chain of nodes including the first terminus end node at a first end of the second chain of nodes and a third terminus end node at a second end of the second chain of nodes wherein the first terminus end node is configured to periodically generate a second synchronous data stream for transmission through the second chain of nodes to the third terminus end node and back to the first terminus end node, and wherein each node of the second chain of nodes is configured to automatically move data one of to and from the second synchronous data stream without management from a master node as the second synchronous data stream passes through the node.

6. The system of claim 5 comprising a first intermediate node in the second chain of nodes between the first terminus end node and the third terminus end node.

7. The system of claim 5 wherein the first terminus end node includes a switch for moving data from the first chain of nodes to the second chain of nodes.

8. The system of claim 1 wherein the determined synchronous time interval is an offset and each node is configured to calculate the offset due to propagation delays of the synchronous data stream to keep the first chain of nodes synchronized.

9. The system of claim 4 wherein each of the first intermediate node and the second intermediate node includes a first port connected to the network connection and a second port connected to the network connection.

10. The system of claim 1 wherein each node includes a configurable logic section containing parallel processing primitives.

11. The system of claim 1 wherein each node of the first chain is configured to be assigned a unique identifier during a first enumeration data stream generated by the first terminus end node.

12. A system for distributed control, data acquisition and data distribution across a plurality of networked nodes of an industrial plant having a plurality of actuators and transducers for controlling and monitoring aspects of the plant comprising:
a first chain of nodes connected by a network, the first chain of nodes including a first terminus end node, a plurality of intermediate nodes and a second terminus end node wherein each of the nodes is coupled to one of an actuator and a transducer in the industrial plant and are configured at start-up to one of remove one or more packets of data and add one or more packets of data to a synchronous data stream at a determined synchronous time interval transmitted from the first terminus end node through the intermediate nodes to the second terminus end node and back to the first terminus end node on a periodic basis without management of a master node and to compute and update propagation delay offsets of the synchronous data stream to update the determined synchronous time interval and provide for synchronous activity of the actuators and transducers in the plant by the nodes, wherein the data moved to and from the synchronous data stream relates to one of monitoring and controlling the one of an actuator and a transducer coupled to the node.

13. The system of claim 12 wherein each node includes a media access controller, a memory and a logic processor.

14. The system of claim 13 wherein each node is connected to a component in a plant.

15. The system of claim 14 wherein one of the intermediate nodes of the first chain of nodes is connected to a servo control device.

16. The system of claim 12 comprising a second chain of nodes connected by a network, the second chain of nodes including the first terminus end node, a third terminus end node and a plurality of intermediate nodes between the first terminus end node and the third terminus end node.

17. The system of claim 16 wherein the first terminus end node includes a switch for transferring data from the first chain of nodes to the second chain of nodes.

18. The system of claim 12 wherein the first terminus end node is configured to transmit an enumeration data packet to the second terminus end node through the intermediate nodes and back to the first terminus end node to provide an initial node value to each node of the first chain of nodes.

19. The system of claim 12 wherein each node includes a countdown timer that is configured to be activated by the synchronous data stream to enable the node to act synchronously with other nodes in the first chain of nodes.

20. A system for a distributed control, data acquisition and data distribution of an industrial plant having a plurality of actuators and transducers for controlling and monitoring aspects of the plant comprising:

a first chain of networked nodes having a first terminus end node, a plurality of intermediate nodes and a second terminus end node, wherein the first terminus end node is configured to generate a first synchronous packet stream for transmission from the first terminus end node to the second terminus end node and back to the first terminus end node, and wherein each node is coupled to one of an actuator and a transducer in the industrial plant and is configured to one of remove one or more packets of data from and add one or more packets of data to the first synchronous data stream at a determined synchronous time interval, wherein the data moved to and from the first synchronous data stream relates to one of monitoring and controlling the one of an actuator and a transducer coupled to the nodes of the first chain of nodes;

a second chain of networked nodes having the first terminus end node from the first chain of nodes, a plurality of intermediate nodes and a third terminus end node, wherein the first terminus end node is configured to generate a second synchronous packet stream for transmission from the first terminus end node to the third terminus end node and back to the first terminus end node, and wherein each node in the second chain of nodes is configured to one of remove one or more packets of data from and add one or more packets of data to the second synchronous data stream;

a first clock for providing a base clock pulse to the first chain of nodes and a derived clock pulse to the second chain of nodes.

* * * * *